UNITED STATES PATENT OFFICE.

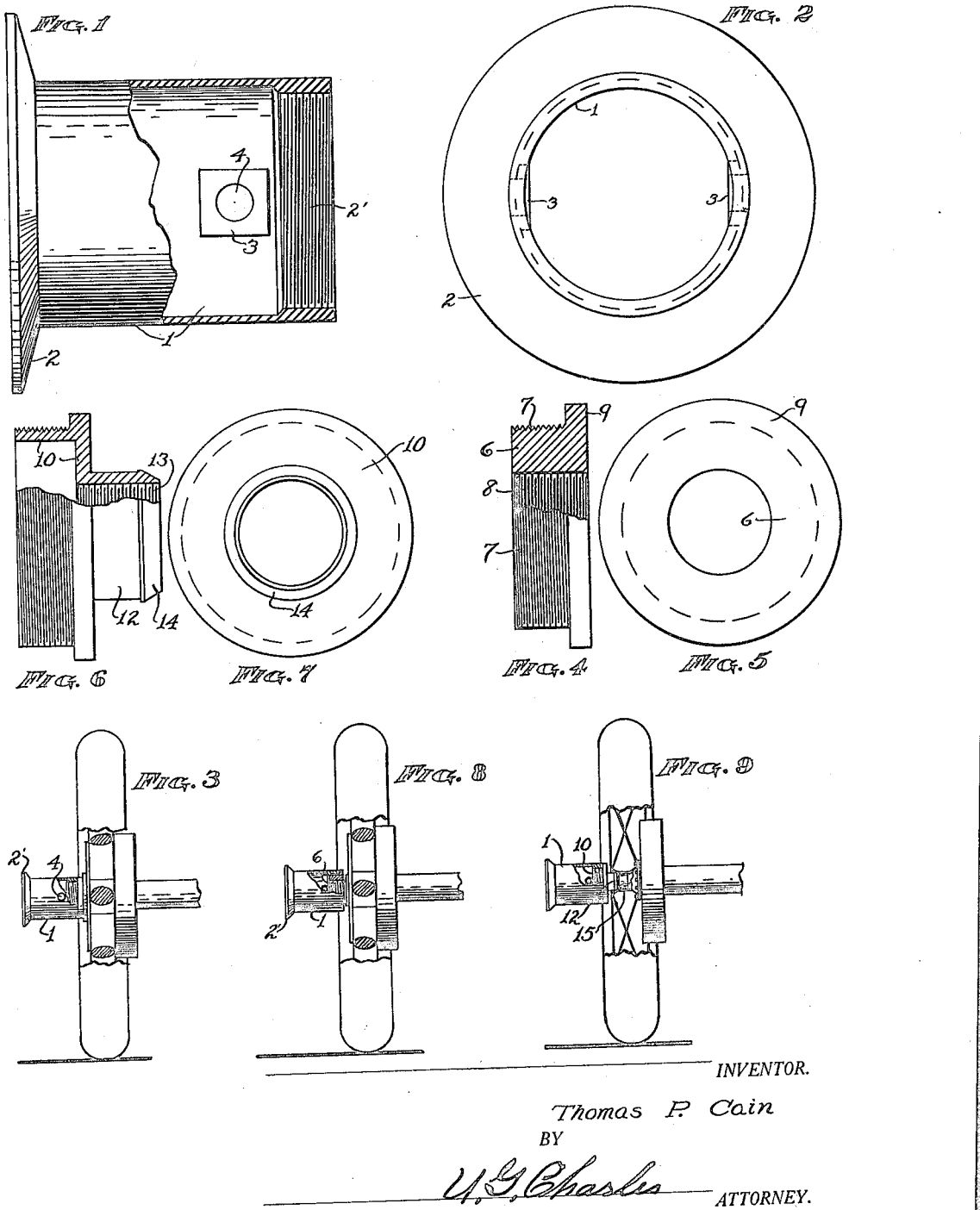

THOMAS P. CAIN, OF WICHITA, KANSAS.

HUB PULL-OUT ATTACHMENT.

1,403,389.  Specification of Letters Patent.  Patented Jan. 10, 1922.

Application filed April 13, 1921. Serial No. 462,141.

*To all whom it may concern:*

Be it known that I, THOMAS P. CAIN, a citizen of the United States, and resident of Wichita, in the county of Sedgwick and State of Kansas, have invented a certain new and useful Hub Pull-Out Attachment, of which the following is a specification.

My invention relates to hub pull-out attachments for motor-vehicles; being designed for use in extricating a motor-vehicle by its own power from a situation in which one or more of the vehicle wheels are sunken so deeply in mud or sand that tire-chains or "mud-hooks" are useless.

My device consists of a spool attachment for either rear hub of any make of motor-vehicle having threaded-on hub-caps. To use the attachment, the hub-cap is removed and the attachment threaded upon the hub extension. A cable is then hooked to the spool and attached to a stake driven into the ground ahead of the vehicle. When power is applied to the rear wheels through the clutch the spool winds the cable upon itself, thereby forcing the vehicle forward. One object of the invention is to make the spool of as small a diameter as possible. A further object, is to provide for using the same size of spool for all makes of cars and still provide for fitting the spools to the various sizes and threads of hubs; also, for making the device serve as wheel-retainer on wire wheels.

These and other objects are attained by the constructions illustrated in the accompanying drawings, in which:—

Fig. 1 is an elevation partly in section, and Fig. 2, an end elevation, of my standard pull-out spool detached; Fig. 3 is a partly sectional elevation of an "artillery" wheel with such a spool substituted for its hub-cap; Fig. 4 is a partly sectional elevation, and Fig. 5, an elevation, of my adapter for smaller hubs of "artillery" wheels; Fig. 6 is a partly sectional elevation and Fig. 7, an elevation of my adapter for wire wheels; Fig. 8 is a partly sectional elevation of an "artillery" wheel with a smaller hub, on which is shown my spool with its adapter; Fig. 9 is a partly sectional elevation of a wire wheel with my device substituted for the hub-cap.

As shown on Figs. 1, 2 and 3, the attachment for artillery-wheel hubs of larger sizes consists of a hollow iron or steel spool, 1, provided with a cable-retaining flange 2 on its outer end. The spool's inner end is reenforced and is cut with an internal thread, 2'. Integral reenforcing bosses 3 are formed at opposite points in the spool, in which two holes 4, of proper diameter to receive a cable hook, are cast or drilled.

As hub-caps on opposite sides of motor-cars are oppositely threaded, the thread 2" may be made right-hand in some of the spools and left-hand in others for commercial reasons. As right-hand hubs are left-hand threaded, and vice versa, these spools will be self-retaining when in use as described.

To apply this same spool (as to size) to smaller hubs of wooden wheels, I provide for each make of smaller vehicle having such wheels, an adapter 6, in the form of a bushing, having external and internal threads 7, 8, and an annular flange 9. Such a bushing, when in position on a hub and supporting a spool 1, is shown by Fig. 8.

To apply this spool 1, or the combined spool and adapter, simply remove the hub-cap from the rear wheel at the side of the vehicle preferred, and thread on the spool (or spool with adapter) and the device will be ready for attachment of the cable.

Wire wheels.

The hub-caps of some wire wheels are so constructed as to form retainers for said wheels. For use on the hubs of wire wheels, I provide a special adapter, 10 (Figs. 6, 7 and 9) which differs from adapter 6 only in having an extension 12 which receives the interior thread 13, which can be threaded upon the end of the axle. The chamfered end 14 of extension 12, serves to retain the hub 15 in the same position as when the regular hub-cap is in place.

To use this device for pulling the vehicle out of the mud, a stake, or an iron rod, is driven at an angle some distance ahead of the vehicle, and a cable tied to the rod or stake. On the other end of this cable is securely fastened a hook adapted to be passed through either of the holes 4 in the spool. The cable must be passed below the spool, as shown. The remainder of the operation has been described hereinbefore.

The small diameter of my spools is advantageous in that it causes the power of the motor to be more effectively applied to the tractive effect upon the vehicle.

After being used, the spool will be tightly jammed upon the hub or axle, and in order to unscrew the spool it may be necessary to insert a rod or a large screwdriver through the holes 4 and use the rod or tool as a lever.

I am aware that there has been patented a pull-out spool adapted for attachment to the spokes of a wheel, and such I disclaim.

What I claim, is:

1. In a device of the class described, a cylindrical spool having a flanged outer end as an integral part of the spool, the inner end of said spool being of increased wall thickness and threaded on its inner surface; a pair of bosses, diametrically opposed on the inner wall of the spool intermediate the flanged end and the threaded end and an opening through each boss.

2. In a device of the class described, a cylindrical spool having a flanged outer end as an integral part of the spool, the inner end of said spool being of increased wall thickness and threaded on its inner surface; a pair of bosses, diametrically opposed on the inner wall of the spool intermediate the flanged end and the threaded end and an opening through each boss; and a bushing, externally and internally threaded, in combination with the threaded end of said spool.

In testimony whereof I hereunto affix my signature.

THOMAS P. CAIN.

Witnesses:
M. Y. CHARLES,
ANNA ORENDORF.